United States Patent [19]
Aoyama

[11] Patent Number: 5,730,097
[45] Date of Patent: Mar. 24, 1998

[54] LUBRICATING STRUCTURE OF CONNECTING ROD AND CRANKSHAFT

[75] Inventor: Shunichi Aoyama, Yokosuka, Japan

[73] Assignee: Nissan Motor Co., Ltd., Yokohama, Japan

[21] Appl. No.: 562,960

[22] Filed: Nov. 27, 1995

[30] Foreign Application Priority Data

Nov. 28, 1994 [JP] Japan ...................................... 6-293056
Mar. 24, 1995 [JP] Japan ...................................... 7-066259

[51] Int. Cl.$^6$ ................................ F01M 1/08; F01M 1/06
[52] U.S. Cl. ...................... 123/196 R; 384/278; 384/288; 384/313
[58] Field of Search ...................... 123/196 R; 384/276, 384/278, 288, 313

[56] References Cited

U.S. PATENT DOCUMENTS

| | | | |
|---|---|---|---|
| 4,525,083 | 6/1985 | Pedersen | 384/278 |
| 4,836,695 | 6/1989 | Baureis et al. | 384/288 |
| 5,056,937 | 10/1991 | Tanaka et al. | 384/278 |
| 5,083,053 | 1/1992 | New | 384/278 |
| 5,137,792 | 8/1992 | Hodes et al. | 428/614 |
| 5,536,587 | 7/1996 | Whitney, Jr. | 428/653 |

FOREIGN PATENT DOCUMENTS 63-28913  2/1988  Japan.
2239296  6/1991  United Kingdom ................... 384/278

Primary Examiner—Erick R. Solis
Attorney, Agent, or Firm—Lowe, Price, LeBlanc & Becker

[57] ABSTRACT

A bearing supporting a crankshaft provided in a connecting rod comprises an overlay in contact with a throw, a metal layer on the outside of the overlay and a back metal on the outside of the metal layer. The hardness of the metal layer is lower than that of the back metal, and the thermal conductivity of the overlay is higher than that of the throw. The metal layer having a lower hardness than the back metal improves the fit of the bearing with the throw, and sharp increase of frictional losses and rise of lubricating oil temperature at high engine rotation speeds are thereby prevented. The overlay having a high thermal conductivity absorbs heat from the minimum thickness oil film formed between the inner surface region of the throw and the bearing, and after the bearing has passed through the minimum thickness oil film, the absorbed heat is again discharged to the lubricating oil. In this way, temperature rise of the throw in the vicinity of the minimum thickness oil film is suppressed, decreased viscosity of the lubricating oil due to temperature rise is prevented, and the thickness of the minimum thickness oil film is maintained.

15 Claims, 17 Drawing Sheets

| PROCESS METHOD | $R_{max}$ | $R_a$ | OUT OF ROUNDNESS |
|---|---|---|---|
| MICRO-FINISH | 0.589 μm | 0.038 μm | 0.63 |
| LAPPING | 5.700 μm | 0.064 μm | 2.93 |

FIG. 4

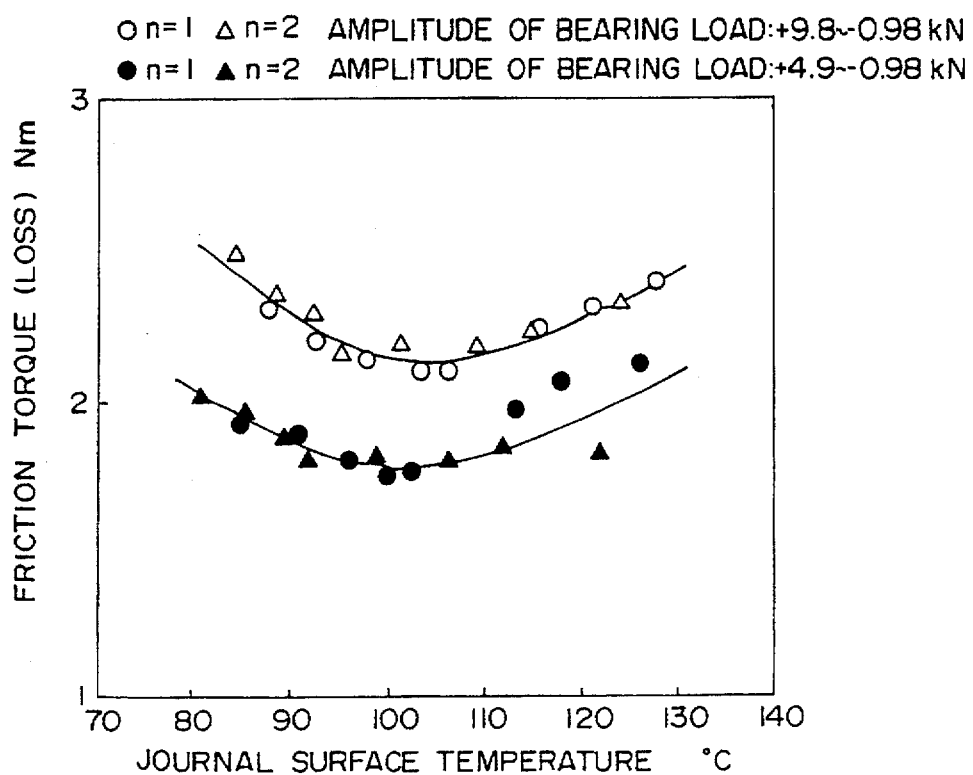
PRIOR ART FIG.10
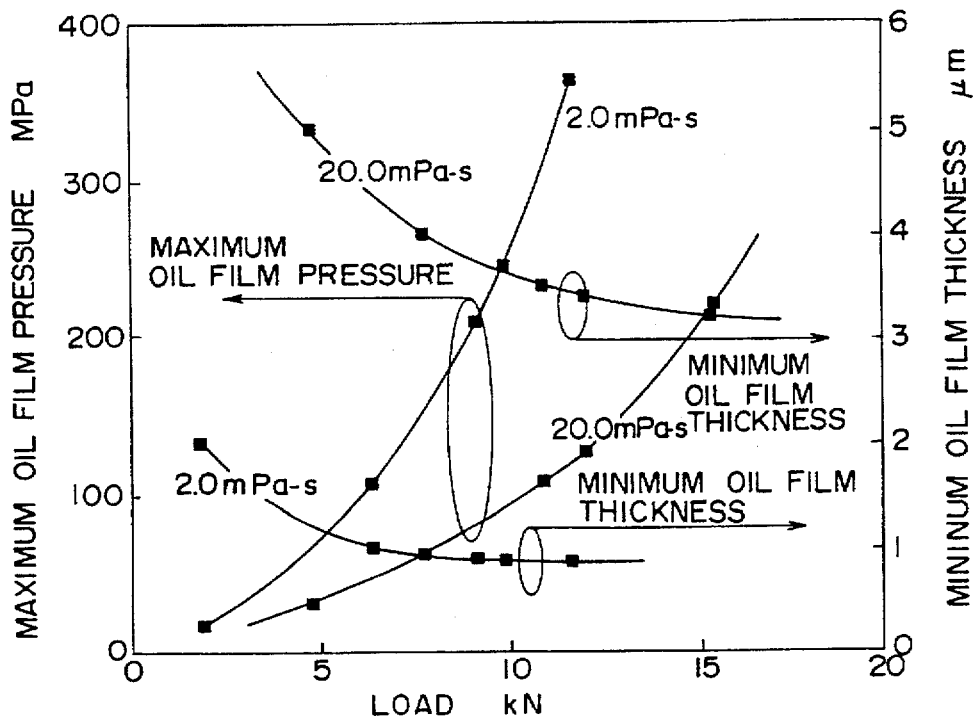
FIG.11

NUMERALS ARE CRANK ANGLES IN DEGREE.
0° CORRESPONDS TO THE TOP DEAD CENTER AT THE END OF COMPRESSION PISTON STROKE.
360° CORRESPONDS TO THE TOP DEAD CENTER AT THE END OF EXHAUST PISTON STROKE.

DISTANCE BETWEEN A POINT AND THE OUTER CIRCLE CORRESPONDS TO CLEARANCE BETWEEN THE BEARING METAL AND THROW SURFACE.

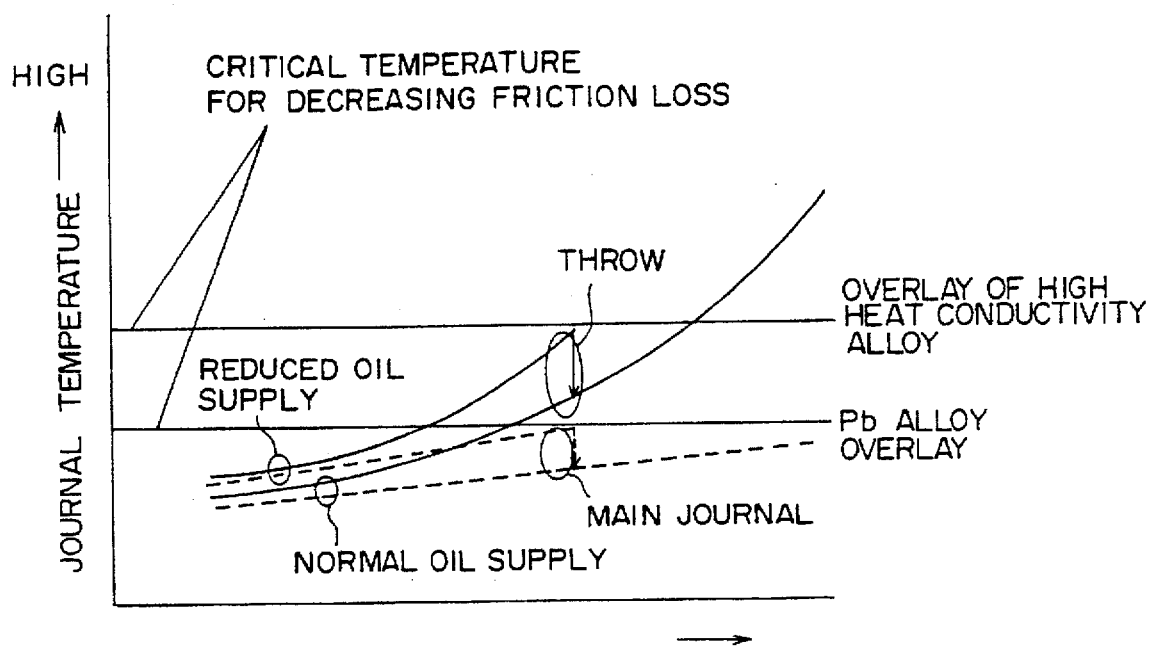
F I G. 18
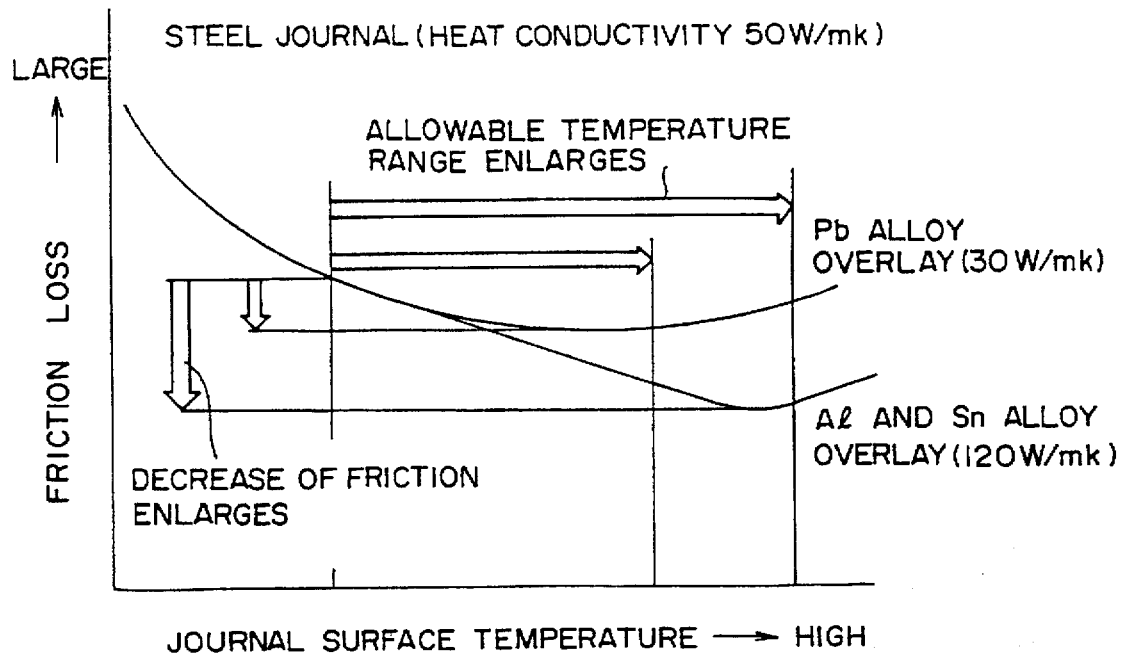
F I G. 19

LUBRICATING STRUCTURE OF CONNECTING ROD AND CRANKSHAFT

FIELD OF THE INVENTION

This invention relates to the lubrication of a connecting rod and crankshaft used in a reciprocating engine.

BACKGROUND OF THE INVENTION

In recent automobile engines, rotation speeds are increasing and water jackets are becoming increasingly compact. As a result, the equilibrium temperature of lubricating oil circulating around the engine is tending to increase, e.g. to about 130° C., and there is a need to increase the heat radiation properties of the lubricating oil film on the sliding parts of the bearing of the connecting rod and the throw of the crankshaft.

The main bearing of the engine crankshaft is generally supplied with lubricating oil from a main gallery. Some of this lubricating oil is sent to the contacting surfaces of the throw and the connecting rod bearing via an inner channel of the crankshaft so as to lubricate these surfaces.

Cooling is also performed by this lubrication, but when the temperature of the sliding surfaces of the throw is measured, the temperature is found to sharply increase with the engine speed, the temperature increase being particularly marked on the inside of the throw, i.e. on the sliding surface facing the rotation center of the crankshaft.

The reason for this is that when the engine is running at high speed, the inertial force of the piston and connecting rod increases in direct proportion to the square of the rotation speed. Hence, the proportion of the load on the Inside of the throw increases, and when the film of lubricating oil becomes thinner, the amount of oil that performs cooling which is supplied to the inside of the throw is limited.

The durability of the connecting rod bearing has a strong dependence on temperature, the upper limit of engine speed or the need for an oil cooler depending on the temperature level inside the throw. The temperature level Inside the throat is therefore an important criterion in maintaining good lubrication of the throw and bearing.

A method of improving cooling of the inner parts of the throw is disclosed for example in Jikko Sho 63-28913 published in 1988 by the Japanese Patent Office. According to this method, an oil passage for sending lubricating oil to the throw is disposed in the vicinity of the sliding surfaces inside the throw, lubricating oil is supplied to these sliding surfaces, and the heat of the inner parts of the throw is also absorbed by the lubricating oil in the passage.

However, there is generally a gap of the order of, for example, only 50 microns between the sliding surfaces of the connecting rod bearing. Consequently, the flowrate of lubricating oil from this gap to the sliding surfaces is small, hence the amount of lubricating oil flowing through the oil passage is small and the structure actually limits the cooling effect that can be achieved.

If the gap between the sliding surfaces is increased in an effort to increase the cooling effect, the amount of lubricating oil increases, but a knocking noise is then produced between the throw and the bearing.

To improve the fit of the bearing with the throw and an ability to absorb any foreign matter trapped between the throw and bearing, thereby preventing the bearing and the throw from sticking, the sliding surfaces of conventional connecting rod bearings were, for example, laminated with a layer of a lead (Pb) alloy.

The thermal conductivity of the layer of lead alloy is far lower than that of the steel throw. According to experiments and analysis carried by the inventor of this invention, when the temperature or pressure of the lubricating oil layer rises due to a sudden load, heat cannot escape to the connecting rod bearing. There is therefore a risk that the viscosity of the oil film will rise considerably due to the rise of temperature, and frictional losses due to the sliding of the throw and bearing will increase.

SUMMARY OF THE INVENTION

It is therefore an object of this invention to ensure good lubricating properties between the throw of a crankshaft and a connecting rod bearing even at high engine speeds.

It is another object of this invention to increase load resistance of a connecting rod bearing.

It is a further object of this invention to improve cooling of other parts of the engine such as the piston or cylinder walls.

In order to achieve the above objects, this invention provides a lubricating structure for a connecting rod and crankshaft applied to a reciprocating engine. This structure comprises a throw formed in the crankshaft, a bearing provided in the connecting rod, this bearing supporting the throw such that the throw is free to rotate, and an oil passage formed in the crankshaft for supplying lubricating oil between the throw and the bearing. The bearing has a laminated structure comprising an overlay in contact with the throw, a metal layer disposed under the overlay and a back metal disposed under the metal layer. The hardness of the metal layer is set to be lower than that of the back metal and the thermal conductivity of the overlay Is set to be higher than that of the throw.

It is preferable that the throw has a microfinishing treatment.

It is also preferable that the overlay comprises an alloy of aluminum and tin.

It is also preferable that the metal layer comprises an alloy of copper and lead.

It is also preferable that the structure further comprises a mechanism for increasing a supply amount of the lubricating oil according to an increase in speed of the engine.

It is also preferable that the structure further comprises an oil pump driven by the engine for discharging the lubricating oil, an oil jet nozzle for ejecting the lubricating oil towards an engine piston, and a mechanism for stopping the ejection of the oil jet nozzle when a discharge pressure of the oil pump does not reach a predetermined value.

The details as well as other features and advantages of this invention are set forth in the remainder of the specification and are shown in the accompanying drawings.

BRIEF DESCRIPTION OF THE DRAWINGS

FIG. 4 is a table specifying a surface roughness of various throws, according to this invention.

FIG. 10 is a graph showing frictional losses of a conventional kelmet bearing metal.

FIG. 11 is a graph showing a relation between a maximum oil film pressure, minimum oil film thickness and bearing load, according to this invention.

FIG. 18 is a graph showing a relation between the engine speed and surface temperature of the throw, according to the second embodiment of this invention.

FIG. 19 is a graph showing a relation between the surface temperature of the throw and frictional losses, according to the second embodiment of this invention.

DESCRIPTION OF THE PREFERRED EMBODIMENTS

Figure 3:
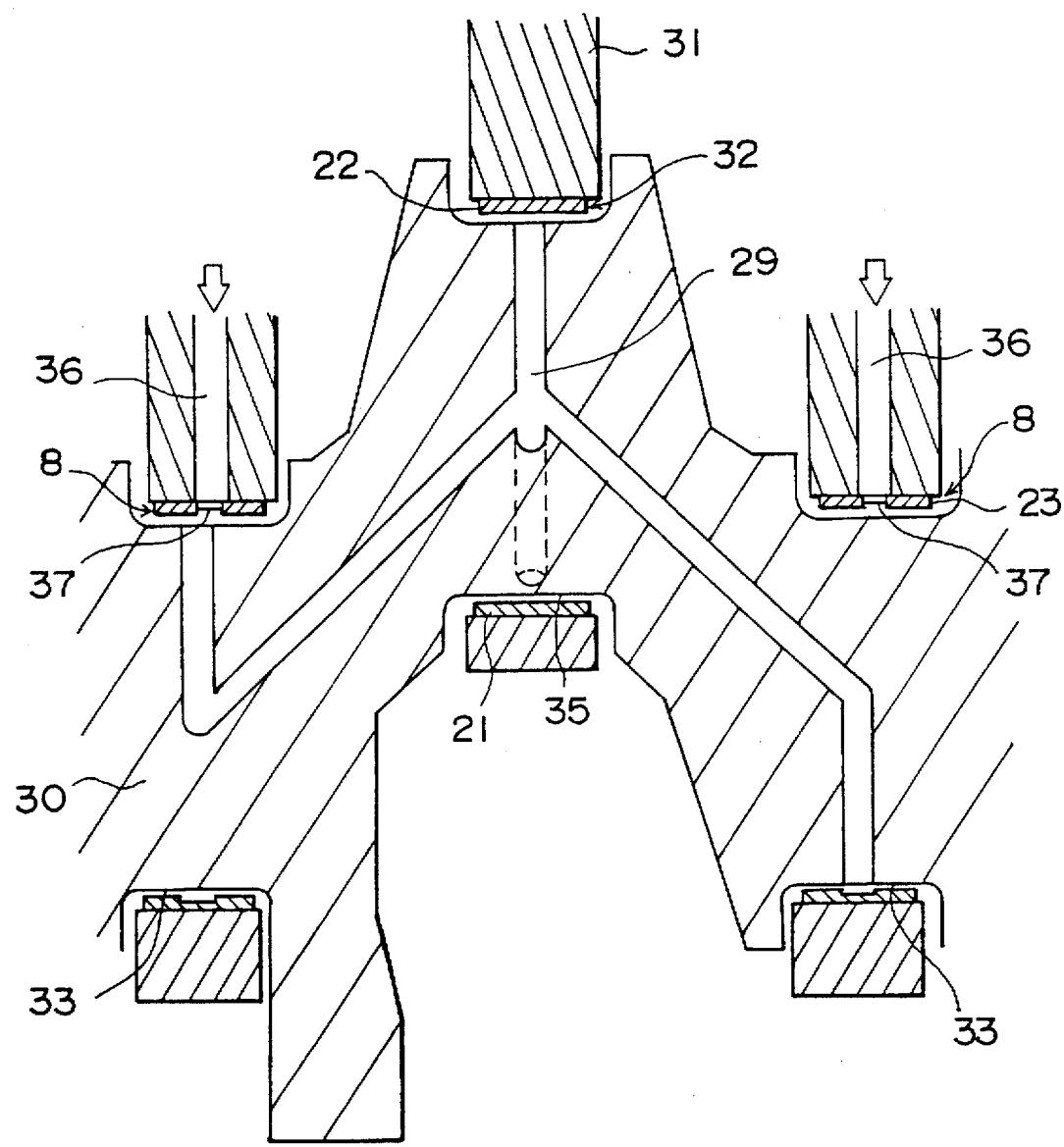
FIG. 3 is a sectional view of the crankshaft and connecting rod bearing showing a layout of an oil passage, according to this invention.

Referring to FIG. 3 of the drawings, a crankshaft 30 comprises a journal 33 supported by a main bearing 8 of an engine block, and a throw 35 supported by a bearing 32 of a connecting rod 31. The crankshaft 30 converts the two-way motion of a piston, not shown, into a rotational motion via the connecting rod 31.

The bearing 32 of the connecting rod 31 comprises upper and lower bearing metals 22, 21 that slide on the throw 35. The throw 35 is formed of steel or of cast iron.

An oil passage 29 is formed inside the crankshaft 30. Lubricating oil discharged by an oil pump, not shown, is supplied to a groove 37 formed in the bearing metal 23 of the main bearing 8 via a supply passage 36 formed in the main bearing 8 from a main gallery of the engine block.

The oil passage 29 opens onto the journal 33 facing the groove 37, lubricating oil from the groove 37 being supplied to the sliding gap between the throw 35 and connecting rod bearing 32 via this passage 29.

The bearing metals 22, 21 comprise a metal layer 1 on the inner side of a steel cylindrical back metal 6 having a semicircular shape, an intermediate layer 3 and an overlay 2, these layers being laminated in the direction of the center of the bearing 32.

Figure 2:
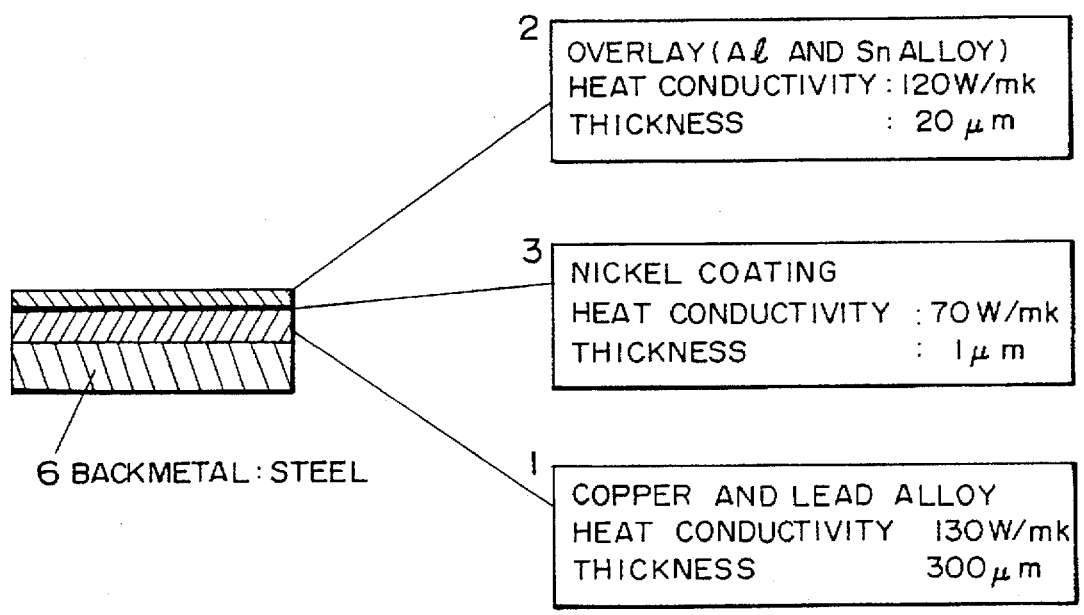
FIG. 2 is an enlarged sectional view of a part of the connecting rod bearing.

In FIG. 2, the metal layer 1 is a 300 mm thick layer of kelmet alloy having copper (Cu) and lead (Pb) as is main components. This alloy is less hard than the back metal 6 that is made of steel. The thermal conductivity of the metal layer 1 is set at about 130 W/mK.

The overlay 2 is a layer that slides on the throw 35 and is formed of a material having higher thermal conductivity than the throw 35. The material is less hard than that of the metal layer. This is in order to improve the fit of the bearing metals 22, 21 with the throw 35 and an ability to absorb any foreign matter trapped between the bearing metals 22, 21 and the throw 35.

In order to satisfy the aforesaid conditions, according to this embodiment, the overlay 2 is formed of an alloy having aluminum (Al) and tin (Sn) as its principal components. The thermal conductivity of the throw 35 which has iron (Fe) as its principal component is approximately 50 W/mK, whereas the thermal conductivity of the overlay 2 is 120 W/mK.

The overlay 2 has a thickness of about 20 μm across the whole inner circumference of the bearing metals 22 and 21.

An intermediate layer 3 of thickness about 1 μm having nickel (Ni) as its principal component is provided between the metal layer 1 and overlay 2. The thermal conductivity of this intermediate layer 3 is about 70 W/mK.

A microfinishing treatment having a precision specified in the table of FIG. 4 is applied to the sliding surface of the throw 35. The precision of the lapping treatment which is normally applied is also given in FIG. 4 for purposes of comparison.

FIG. 10 shows frictional losses measured according to the surface temperature of the throw 35 in the case where the throw 35 is supported by a conventional bearing metal with an overlay of a lead alloy having a low thermal conductivity. It is seen from this figure that frictional losses decrease as the temperature of the throw surface increases up to about 100° C., and frictional losses increase beyond this temperature.

According to the inventor's research, the reason for this is that under high temperature, high load lubricating conditions when the temperature of the lubricating oil exceeds 100° C., the thinnest oil film is of the order of 1–2 microns, lubricating oil viscosity rises due to pressure increase, the shear rate of the thin part of the oil film increases and frictional losses increase sharply.

Figure 12:
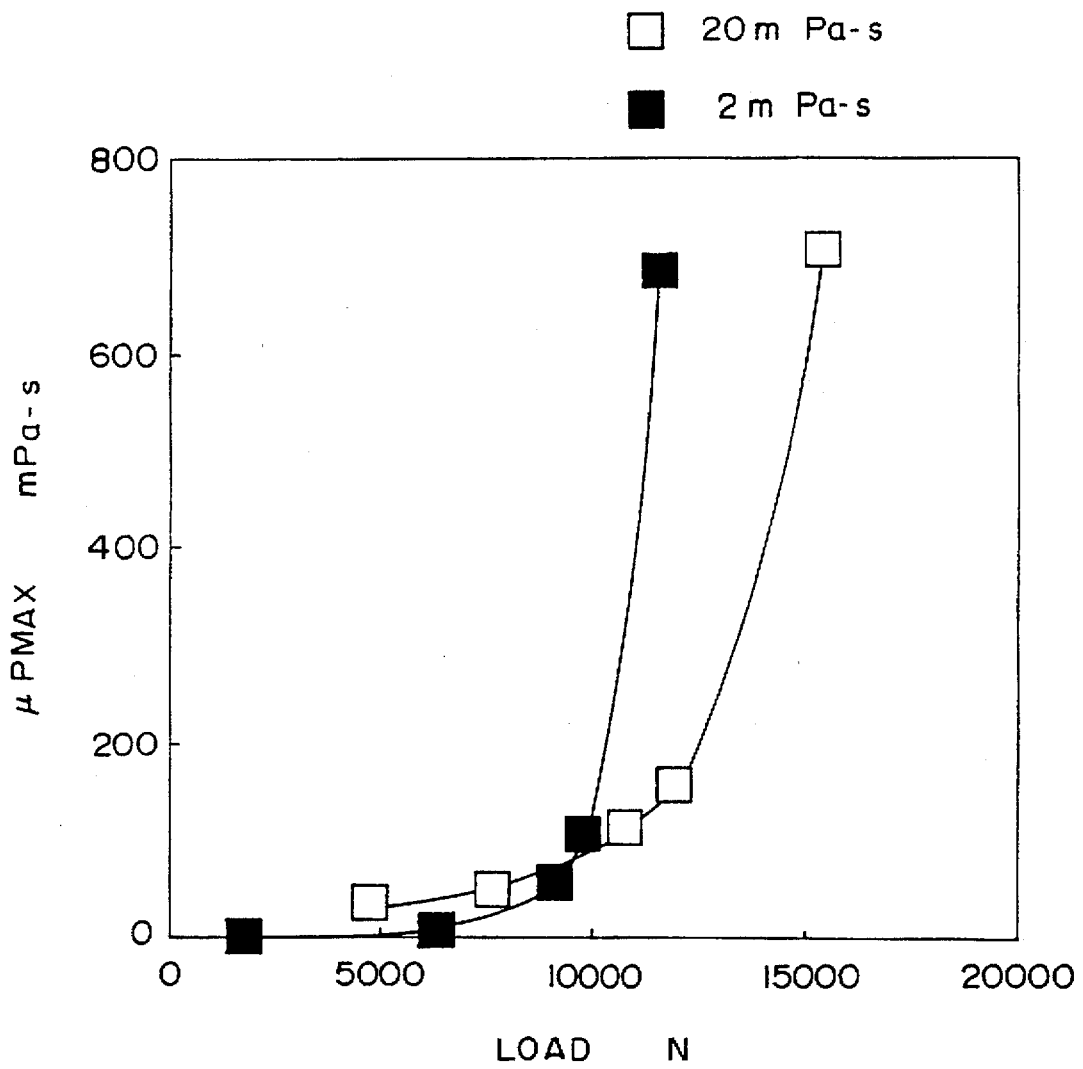
FIG. 12 is a graph showing a relation between a bearing load and lubricating oil viscosity, according to this invention.
Figure 13:
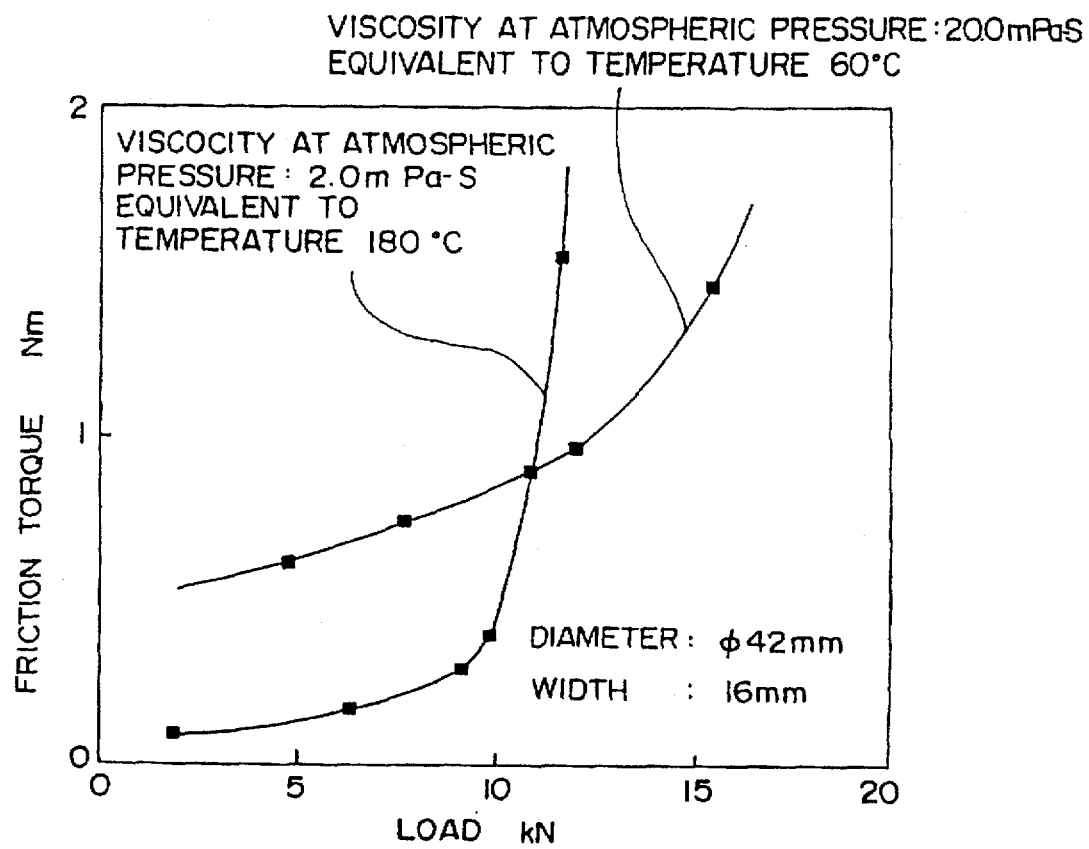
FIG. 13 is a graph showing a relation between the bearing load and a frictional torque, according to this invention.

FIGS. 11–13 show the results of calculating bearing frictional losses under static load conditions. The viscosity μ of the oil film was calculated using the equation of Braus shown below:

$$\mu = \mu_0 \exp(\alpha \cdot P) \tag{1}$$

where,

P is pressure, $\mu_0$ is viscosity at atmospheric pressure and

α is a pressure/viscosity coefficient.

Equation (1) and Reynold's bearing equation were solved as simultaneous equations to calculate the oil film pressure and frictional losses. For Reynold's equation, the limiting width theory under a static load was applied and conditions were given in consideration of a viscosity distribution in the lubricating oil. By this calculation, lubricating conditions using a low temperature lubricating oil and lubricating conditions using a lubricating oil having 1/10 of the viscosity at atmospheric pressure, were compared.

According to FIGS. 11–13, under high load conditions, frictional losses increase as oil temperature rises. As the minimum oil film thickness decreases at high temperature, the oil film pressure increases, and as viscosity rises with pressure, the lubricating oil viscosity of the minimum thickness oil film increases under high temperature conditions. Further as the oil film is thin, the shear rate is high, and frictional losses over the bearing as a whole tend to increase.

In order to reduce frictional losses under these high temperature, high load lubricating conditions, heat must be allowed to escape rapidly from the thin parts of the oil film where the pressure and viscosity have increased, and temperature rise of the lubricating oil must be controlled. This thin part is denoted by the numeral 4 in FIG. 1, and it is referred to hereinafter as the minimum thickness oil film.

Lubricating oil is led from the supply passage 36 to the groove 37 of the main bearing 8 which supports the journal 33, lubricates a main bearing 13, and is supplied to a bearing gap 5 between the upper bearing metal 22 and the throw 35 via an internal crank passage 29 that connects with the groove 37 so as to lubricate the connecting rod bearing 32.

The lubricating oil supplied to the bearing gap 5 cools the throw 35. The overlay 2 of the upper and lower metals 22, 21 of the connecting rod bearing 32 are formed of an aluminum alloy that has a higher thermal conductivity than that of the throw 35. Radiation of heat from the lubricating oil film to the overlay is therefore enhanced compared to the case of the conventional bearing metal which is formed of a lead alloy having a lower thermal conductivity than that of the overlay.

Figure 1:
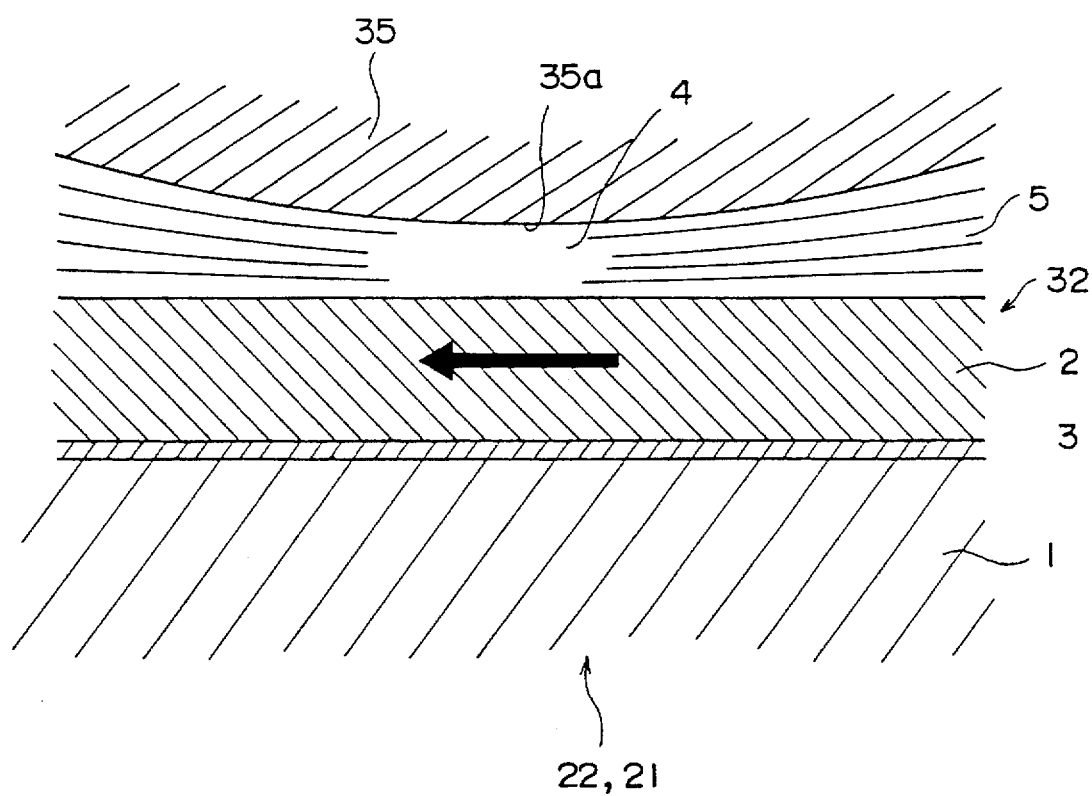
FIG. 1 is an enlarged sectional view of sliding parts of a connecting rod bearing and a throw of a crankshaft according to this invention.
Figure 14:
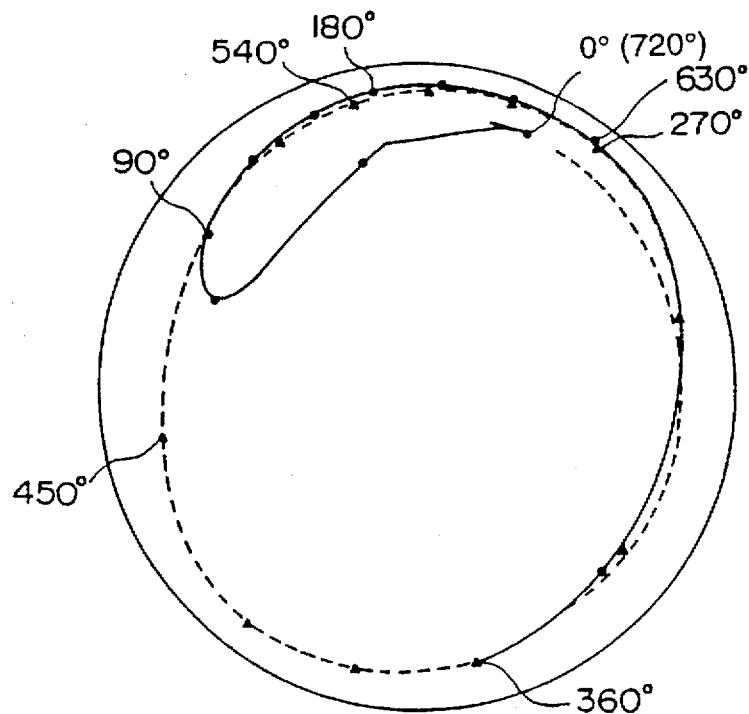
FIG. 14 is a diagram showing a variation of load and point of action of the load on a throw, according to this invention.

As shown in FIG. 1, an inner area 35a of the throw 35 always faces the minimum thickness oil film 4. On the other hand, the parts of the upper and lower metals 22, 21 which face the minimum thickness oil film 4 vary over almost the entire circumference of the bearing, as shown in FIG. 14, as the crankshaft 30 rotates.

Viewed from the bearing 32, the appearance of the minimum thickness oil film 4 is an instantaneous event, and the position at which it appears is constantly varying. A frictional torque is generated depending on the oil film shear rate resulting from the relative rotation of a journal and the bearing.

In this case, the heat generated in the minimum thickness oil film 4 is transmitted to the overlay 2 which has a higher thermal conductivity than the throw 35. When the position facing the minimum thickness oil film 4 moves in the circumferential direction as shown by the arrow in FIG. 1 due to the rotation of the crankshaft 30 so that this position is no longer facing the minimum thickness oil film 4, the heat of the minimum thickness oil film 4 of lubricating oil film is first absorbed by the overlay 2, and again discharged into the lubricating oil film at a position distant from the minimum thickness oil film 4 so as to prevent the minimum thickness oil film 4 from reaching a high temperature.

The overlay 2 generally has a thickness of only 20 μm, however as the thickness of the minimum thickness oil film 4 is of the order of several μm, it has adequate heat capacity to absorb the heat generated by the minimum thickness oil film 4. Further, as the minimum thickness oil film 4 and bearing 32 move instantaneously relative to each other, the overlay 2 does not become thermally saturated even if most of the heat generated by the minimum thickness oil film 4 flows into it.

In the case of a conventional bearing metal wherein the overlay is formed of a lead alloy, the thermal conductivity of the overlay is about 30 W/mK, and the thermal conductivity of the throw 35 having iron as its main component is about 50 W/mK. Hence, as the thermal conductivity of the overlay is far less than that of the throw 35, most of the frictional heat generated by the minimum thickness oil film 4 is transmitted to the throw 35. In the throw 35, the minimum thickness oil film 4 is always situated within the inner area 35a, and a local temperature rise occurs in the throw 35 due to accumulation of this heat so that the frictional heat of the minimum thickness oil film 4 is further increased in a vicious cycle.

Figure 5:
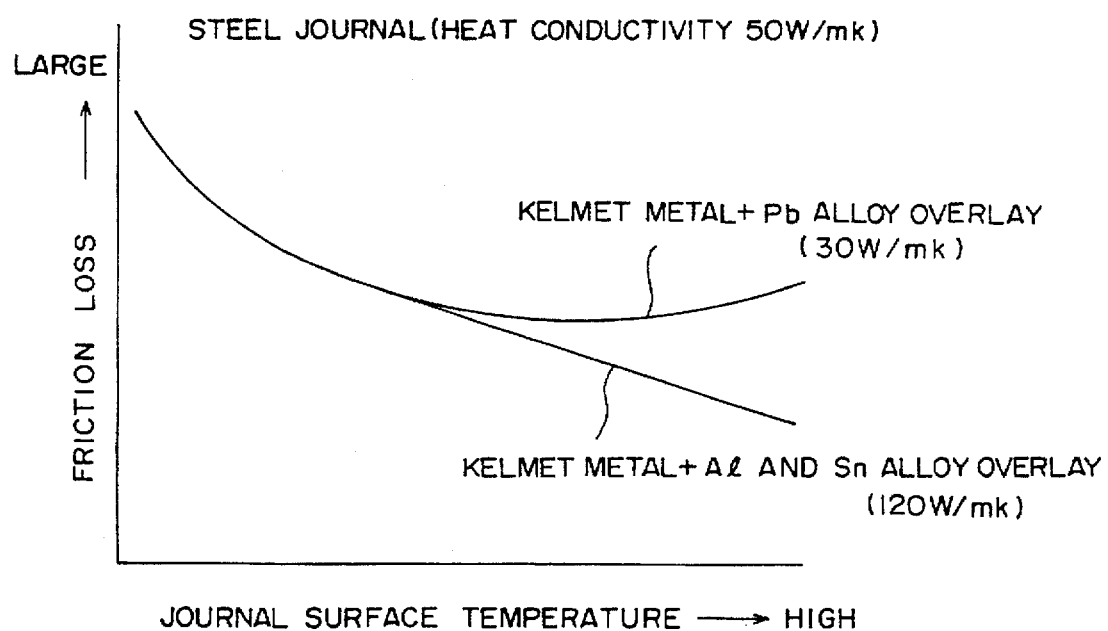
FIG. 5 is a graph showing a relation between a surface temperature of a throw and frictional losses, according to this invention.

FIG. 5 shows the result of measuring frictional losses according to bearing surface temperature in the case of a conventional bearing metal having a lead alloy overlay and a bearing metal according to this invention having an alumina alloy overlay.

It is seen from this data that whereas frictional losses of the lead alloy overlay relatively increase as the surface temperature of the throw 35 increases, the frictional losses of the aluminum alloy overlay decrease with increasing temperature. This is due to the fact that as the thermal conductivity of the aluminum alloy overlay is as high as 120 W/mK, most of the frictional heat generated in the minimum thickness oil film in the high temperature region is probably transmitted to the bearing metal.

Figure 6:
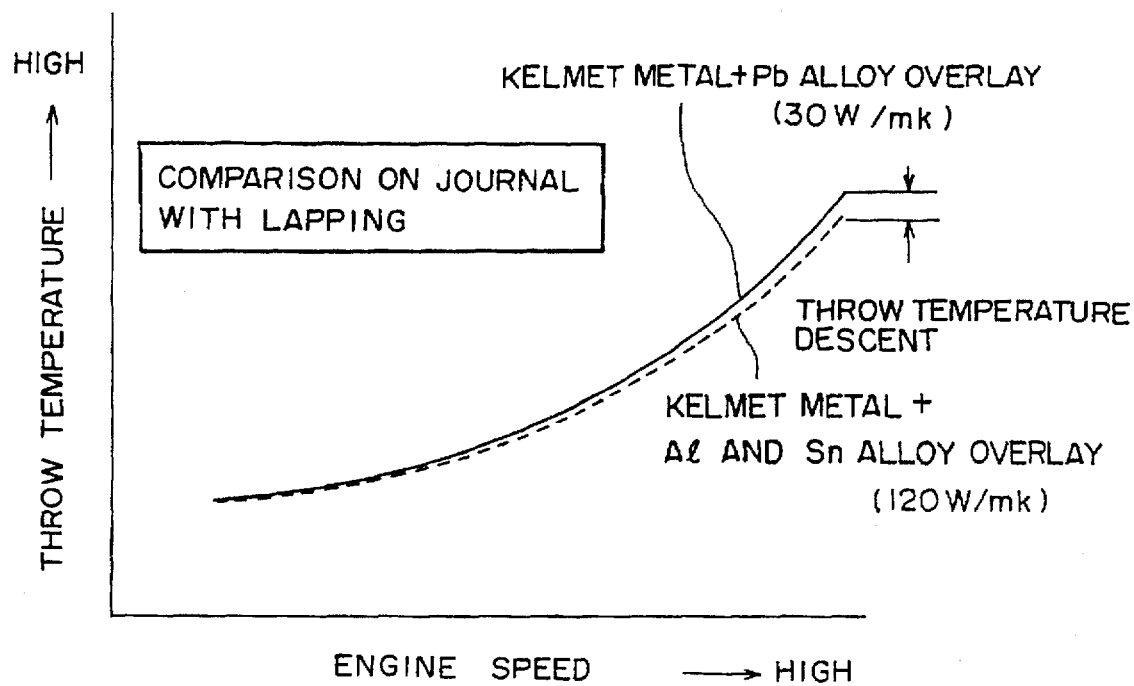
FIG. 6 is a graph showing a relation between an engine speed and the surface temperature of a throw that has received lapping treatment, according to this invention.
Figure 7:
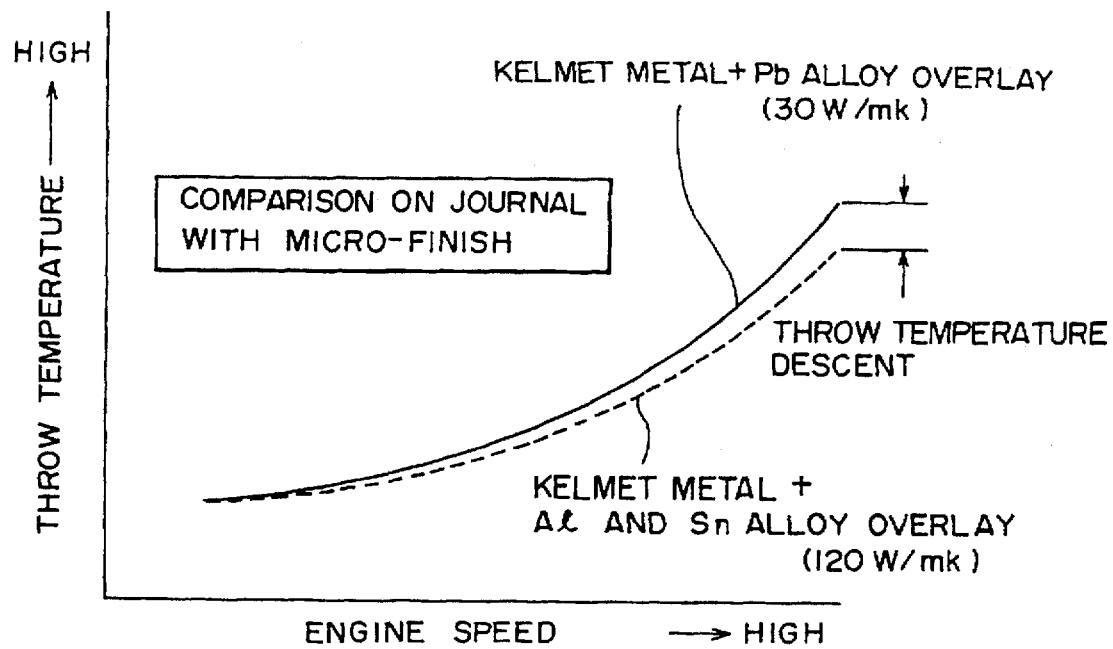
FIG. 7 is a graph showing a relation between the engine speed and the surface temperature of a throw that has received a microfinishing treatment, according to this invention.

FIGS. 6 and 7 show the result of measuring the temperature of the throw when a crankshaft in an actual engine is rotated by motoring. It is seen that, as described hereintofore, the fall of temperature when the material of the bearing metal is changed, is greater for a throw which has received microfinishing treatment as shown in FIG. 7 than for a throw which has received lapping treatment as shown in FIG. 6.

The reason for this is that the oil film in contact with the journal that has received microfinishing treatment and the smooth bearing, retains its fluid lubricating properties even when the oil fill becomes thinner under high temperature, high pressure conditions, and it is therefore actually more easily affected by local increases of viscosity of the lubricating oil. The effect of differences in the overlay on temperature drops is therefore greater than in the case of a bearing which has received lapping treatment.

Figure 8:
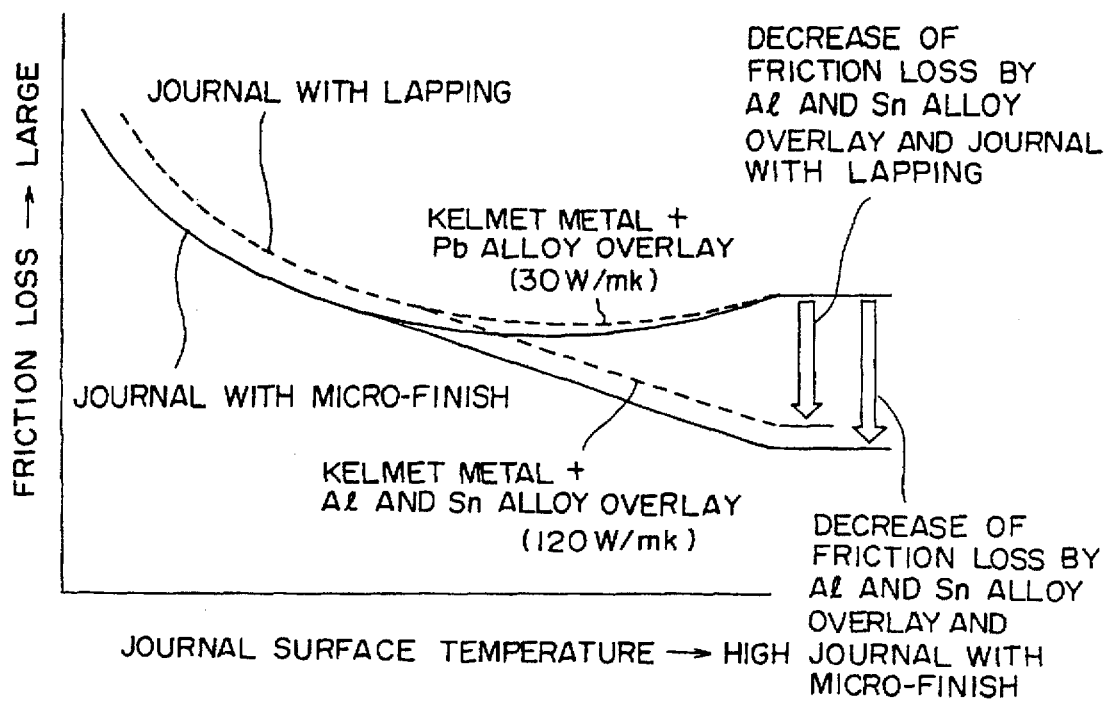
FIG. 8 is a graph showing a relation between the surface temperature, frictional losses and surface treatment of the throw, according to this invention.

FIG. 8 shows the result of measuring the relation between journal surface temperature and frictional losses in the case of combinations of a bearing metal having a lead alloy overlay, a bearing metal having an aluminum alloy overlay, a journal to which a lapping finishing treatment was applied and a journal to which a microfinishing treatment was applied. From this data, it is seen that decline of frictional losses due to change of material of the bearing metal, is greater in the case of the journal to which a microfinishing treatment was applied than in the case of the journal to which lapping finishing treatment was applied.

It is therefore seen that a structure wherein the throw 35 that has received microfinishing treatment is supported by upper and lower bearing metals 22, 21 having the overlay 2 formed of an aluminum alloy which has a higher thermal conductivity than the throw 35, increases the advantages of high load resistance and heat resistance that characterize kelmet metal.

Figure 9:
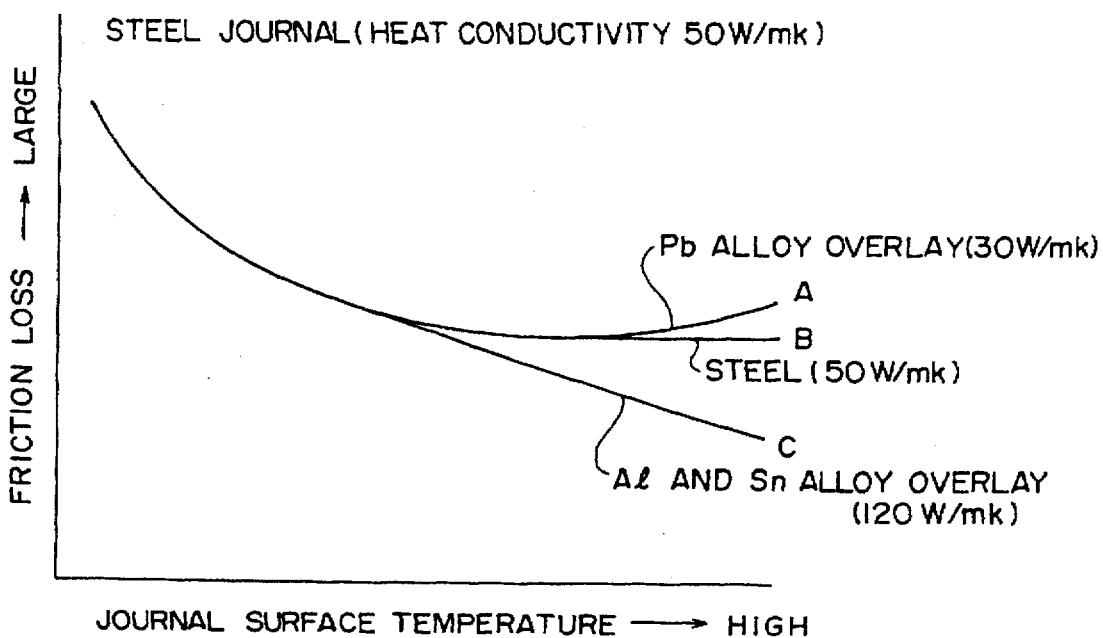
FIG. 9 is a graph showing a relation between the surface temperature of the throw, frictional losses and a material of a bearing metal overlay, according to this invention.

FIG. 9 shows the result of measuring the relation between journal surface temperature and frictional losses in the case of a bearing metal having a lead alloy overlay, a bearing metal having an aluminum alloy overlay, and a bearing metal having an overlay whereof the main component is iron which is the same material as that of the throw 35.

From this data it is seen that frictional losses of a lead alloy overlay increase and frictional losses of an aluminum alloy overlay decrease as the journal surface temperature rises. The iron overlay is intermediate, there being practically being no variation in frictional losses.

Hence, by constructing the overlay 2 of the upper and lower bearing metals 22, 21 of a material having a higher thermal conductivity than the throw 35, a desirable circulating effect is achieved. Namely, heat generated in the minimum thickness oil film 4 which tends to reach a high temperature is absorbed by the overlay 2, temperature rise of the throw 35 is suppressed, and frictional heat generated in the minimum thickness oil film 4 is reduced so that the temperature of the throw 35 is further lowered.

The material of the overlay 2 is not limited to aluminum or tin-based aluminum alloys. Other materials having a higher thermal conductivity than iron which is the material of the throw 35, and which could be used here, are aluminum-tin-lead alloys, nickel alloys or copper alloys. Also, if manufacturing costs are not an issue, silver (Ag), which has a higher thermal conductivity than aluminum alloy, may be used.

Although not a feature of this invention, heat generated by the minimum thickness oil film 4 which tends to reach a high temperature may also be absorbed by the metal layer 1 of the bearing metal even when an overlay is not provided, the metal layer 1 of the upper and lower bearing metals then being formed of an aluminum-tin or other aluminum alloy.

However, when the metal layer 1 of the upper and lower bearing metals is formed of an aluminum alloy, surface pressure resistance falls to 80% or less compared to the bearing metals 22, 21 having a metal layer 1 formed of kelmet alloy, and also durability cannot be guaranteed in the high speed region in which this invention is effective.

In a large diesel engine where engine speed is limited to the low and media engine speed regions, surface pressure resistance of bearings is required to be higher than in the case of a gasoline engine, so a structure is occasionally employed wherein a kelmet alloy metal layer and aluminum alloy overlay are used for only the upper bearing metal on which combustion pressure acts via the piston.

However, according to the aforesaid construction, the conditions are completely different in the case of high speed rotation, and high overloads progressively act over the whole circumference of the bearing via the throw. In addition, in a rotation position where the overlay of the lower bearing metal slides on the minimum thickness oil film 4, the heat generated in the film is transmitted to the throw. Hence, even when an aluminum alloy overlay is provided only on the lower bearing metal, it is difficult to fully suppress temperature rise of the throw and increase of frictional losses cannot be avoided.

A second embodiment of this invention will now be described with reference to FIGS. 15–19. The same symbols have been used to denote parts which are the same as those of FIG. 1, etc.

Figure 15:
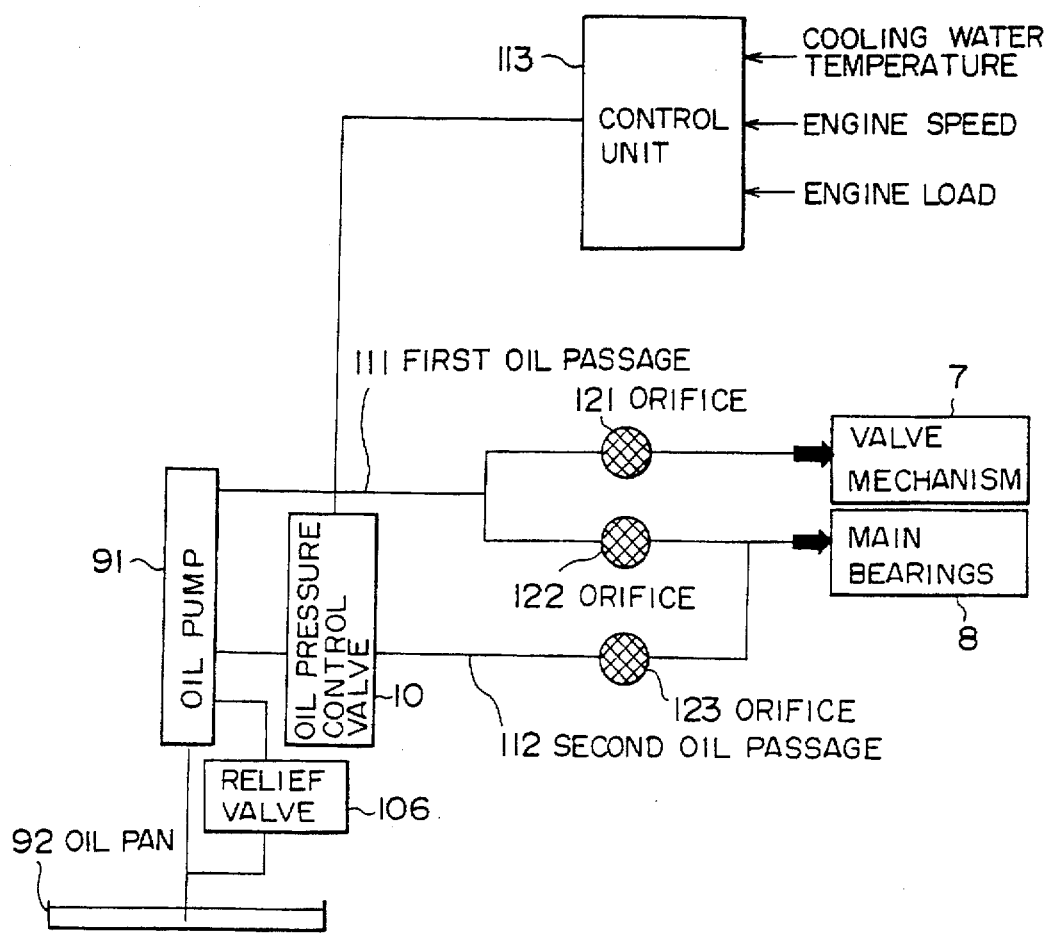
FIG. 15 is a schematic diagram of a lubricating oil supply system according to a second embodiment of this invention.

Referring to FIG. 15, a fixed capacity oil pump 91 driven by an engine supplies lubricating oil, aspirated from an oil pan 92, to the various parts of the engine via a first oil supply passage 111 and second oil supply passage 112.

A relief valve 106 connected to the discharge side of the oil pump 91 opens when the discharge pressure of the oil pump 91 rises above a predetermined value so as to maintain the discharge pressure at this value or below.

The second oil supply passage 112 connected to the discharge side of the oil pump 91 via an oil pressure supply control valve 10, communicates with the main bearing 8 of the crankshaft 30 via an orifice 123.

Figure 16:
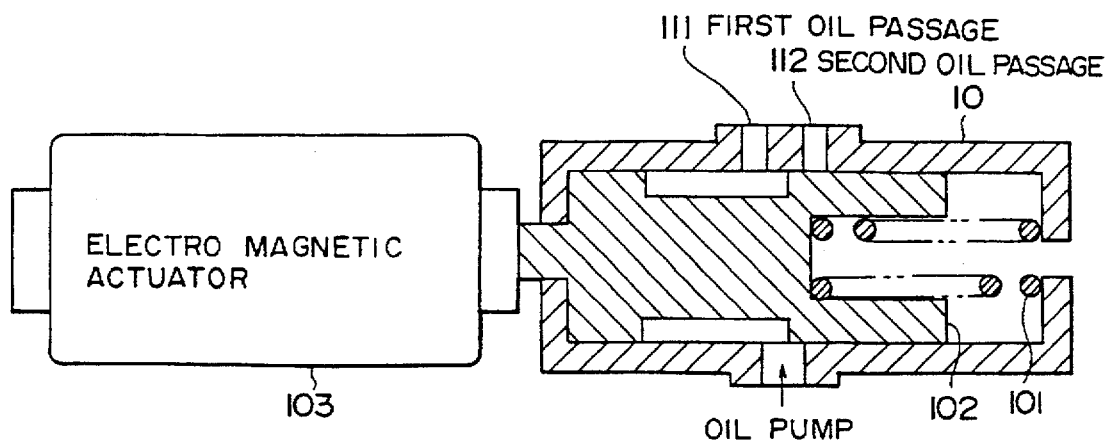
FIG. 16 is a schematic sectional view of a lubricating oil supply control valve according to the second embodiment of this invention.

The oil pressure supply control valve 10 comprises a spool valve 102 pushed in the valve closing direction via a return spring 101, and an electromagnetic actuator 103 that drives the valve 102 in the valve opening direction against the force of the return spring 101, as shown in FIG. 16. When the electromagnetic actuator 103 is not energized, the second oil supply passage 112 is closed by the pushing force of the return spring 101 as shown in the figure, and when the electromagnetic actuator 103 is energized, the second oil supply passage 112 opens against the pushing force of the return spring 101.

The first oil supply passage 111 communicates with a valve mechanism 7 via an orifice 121, and also with the main bearing 8 of the crankshaft 30 via an orifice 122.

An engine speed detection signal is input to a control unit 113, and in a high speed region where the engine rotation speed rises above a predetermined value, the control unit 113 displaces the valve body 102 of the oil pressure supply control valve 10 towards the right against the force of the spring 101 as shown in FIG. 16 so as to open the second oil supply passage 112.

Figure 17:
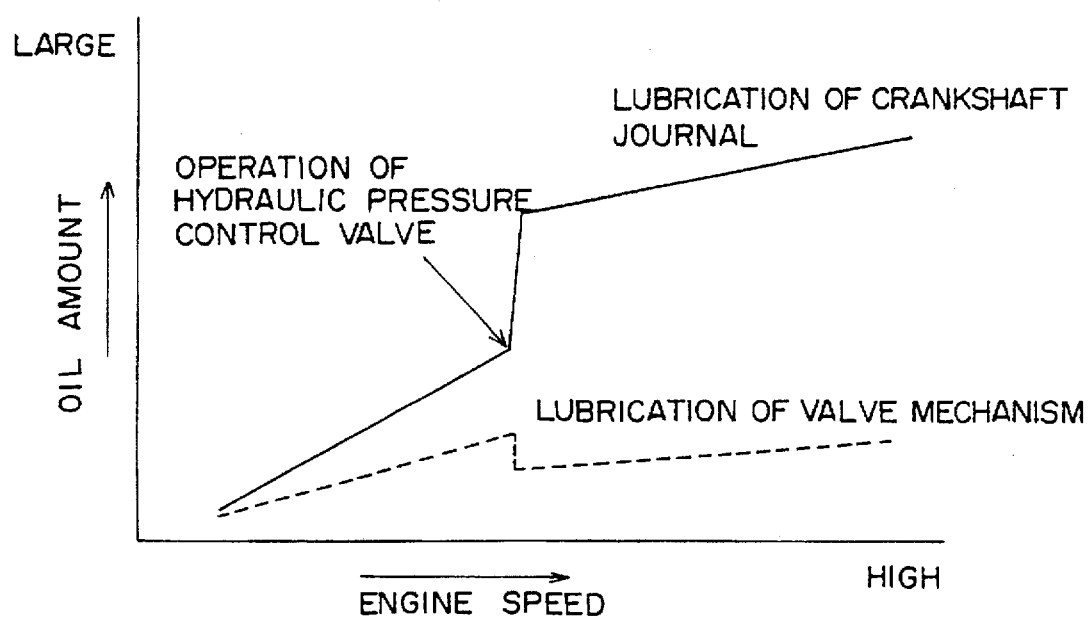
FIG. 17 is a graph showing a relation between the engine speed and a lubricating oil supply amount, according to the second embodiment of this invention.
Figure 20:
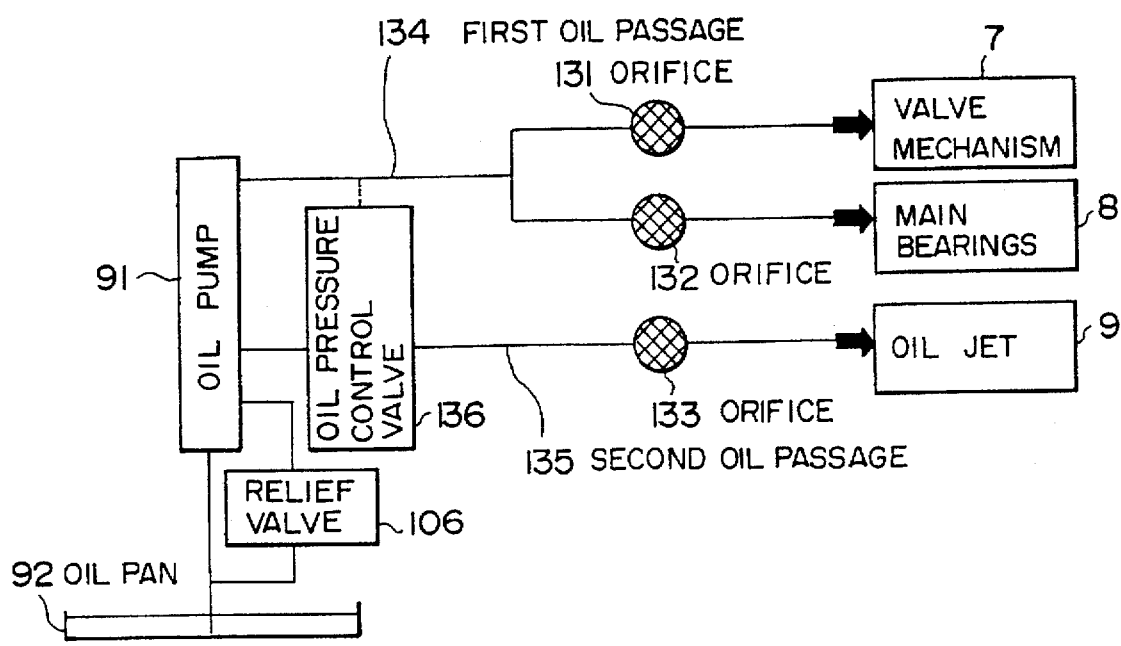
FIG. 20 is a schematic diagram of the lubricating oil system according to a third embodiment of this invention.

Whereas the lubricating oil mount supplied to the main bearing 8 of the crankshaft 30 increases in steps as shown by the solid line in FIG. 17 due to the action of this oil pressure supply control valve 10, the lubricating oil mount supplied to the valve mechanism 7 from the first oil supply passage 111 decreases in steps as shown by the dotted line in FIG. 17.

In the low and medium engine speed regions when the frictional heat generated in the main bearing 8 and connecting rod bearing 32 is small, the oil pressure supply control valve 10 is closed so that the lubricating oil amount supplied to the main bearing 8 of the crankshaft 30 is kept low. In this state, heat radiation to the lubricating oil from the aluminum alloy overlay 2 of the bearing metals 21, 22 is small, and as the temperatures of the lubricating oil of the main bearing 8 and connecting rod bearing 32 are maintained at suitable levels, oil viscosity is low and frictional losses are also small.

In the high engine speed region where frictional heat generated in the main bearing 8 and connecting rod bearing 32 increases, the oil pressure supply control valve 10 opens so that the lubricating oil amount supplied to the main bearing 8 of the crankshaft 30 increases. As a result, the large amount of frictional heat generated in the main bearing 8 and connecting rod bearing 32 is radiated to the lubricating oil, the bearings do not overheat, and sticking, etc. is avoided.

As shown in FIG. 18, the temperature rise relative to engine rotation speed is much larger for the connecting rod bearing 32 than for the main bearing 8. The reason for this is not only that the inertial load on the connecting rod bearing 32 increases sharply due to increase of engine speed, but also that engine combustion heat is transmitted to the bearing 32 via the connecting rod 31. Moreover, the lubricating oil amount supplied to the connecting rod bearing 32 is less than the lubricating oil amount supplied to the main bearing 8 via the groove 37. Hence, as thermal conditions are largely different for the connecting rod bearing 32 and main bearing 8, the optimum supply amount is different for the bearing 8 and the bearing 32. For example, if a connecting rod bearing 32 is provided with a conventional lead alloy overlay, it may occur that frictional losses increase in the bearing 32 although they decrease in the main bearing 8 when the lubricating oil supply amount to the crankshaft 30 is decreased. In such a case, it is difficult to decrease the lubricating oil supply amount to the crankshaft 30.

FIG. 19 shows a temperature at which frictional losses start increasing after they had been decreasing with rise of journal surface temperature, i.e. this temperature is a critical temperature for decreasing frictional loss. As is clear from this diagram, the amount of heat radiation to the lubricating oil is greater for the aluminum alloy overlay than for the lead alloy overlay, so the critical temperature for decreasing frictional loss is shifted to a higher temperature with the aluminum alloy overlay. Consequently the range of running conditions over which the oil supply amount can be reduced is also wider for the aluminum alloy overlay, excepting when a large amount of lubricating oil has to be supplied to the bearing metals 22, 21 as for example when the engine continues to run under high speed, high load conditions.

By providing an aluminum overlay 2 on the bearing metals 21, 22, the engine speed region when the oil pressure supply control valve 10 is closed, is wider than in the conventional structure comprising a lead alloy overlay. Hence, frictional losses of the main bearing 8 and connecting rod bearing 32 can be decreased more than in the case of the conventional bearing structure, so engine fuel consumption and power are improved.

Next, a third embodiment of this invention will be described with reference to FIGS. 20–23. According also to this embodiment, the same symbols are used to denote parts which are the same as those of the first embodiment.

The fixed capacity oil pump 91 is driven by the engine, and lubricating oil aspirated from the oil pan 92 is supplied to the various parts of the engine via a first oil supply passage 134 and second oil supply passage 135.

The relief valve 106 connected to the discharge side of the oil pump 91 opens when the discharge pressure of the pump 91 rises above a predetermined value so that the discharge pressure is kept at or below this predetermined value.

The first oil supply passage 134 connected to the discharge side of the oil pump 91 communicates with the valve mechanism 7 via the orifice 121, and communicates with the main bearing 8 of the crankshaft 30 via the orifice 122.

The second oil supply passage 135 connected to the discharge side of the oil pump 91 via an oil pressure supply control valve 136 communicates with an oil jet nozzle 9 via an orifice 133.

Figure 21:
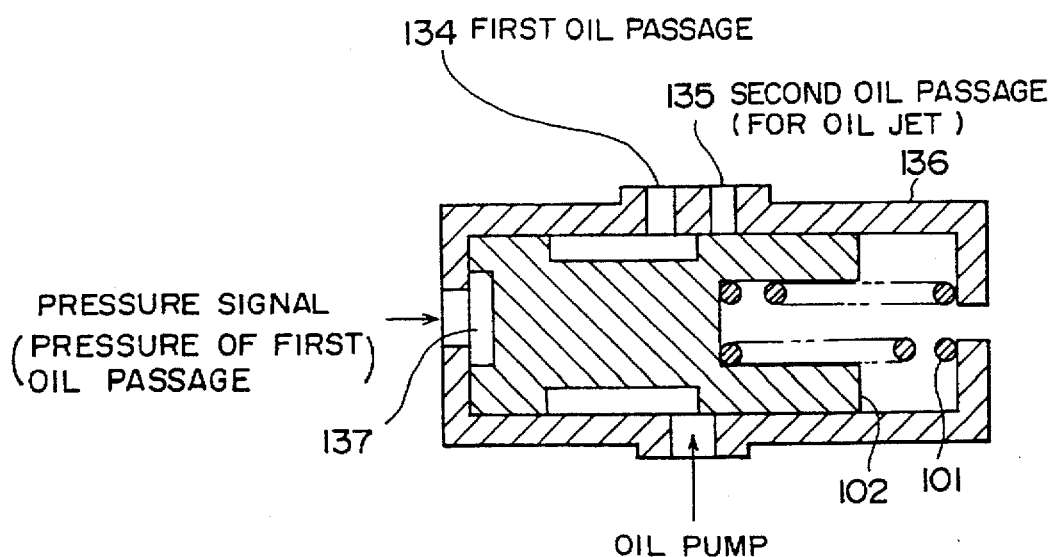
FIG. 21 is a schematic sectional view of the lubricating oil supply control valve according to the third embodiment of this invention.

The oil pressure supply control valve 136 comprises the spool valve 102 that is pushed in the valve opening direction via the return spring 101, and an oil pressure chamber 137 that drives the spool valve 102 against the force of the return spring 101, as shown in FIG. 21. The oil pressure chamber 137 communicates with the first oil supply passage 134 on the upstream side of the orifices 131, 132 of.

Figure 22:
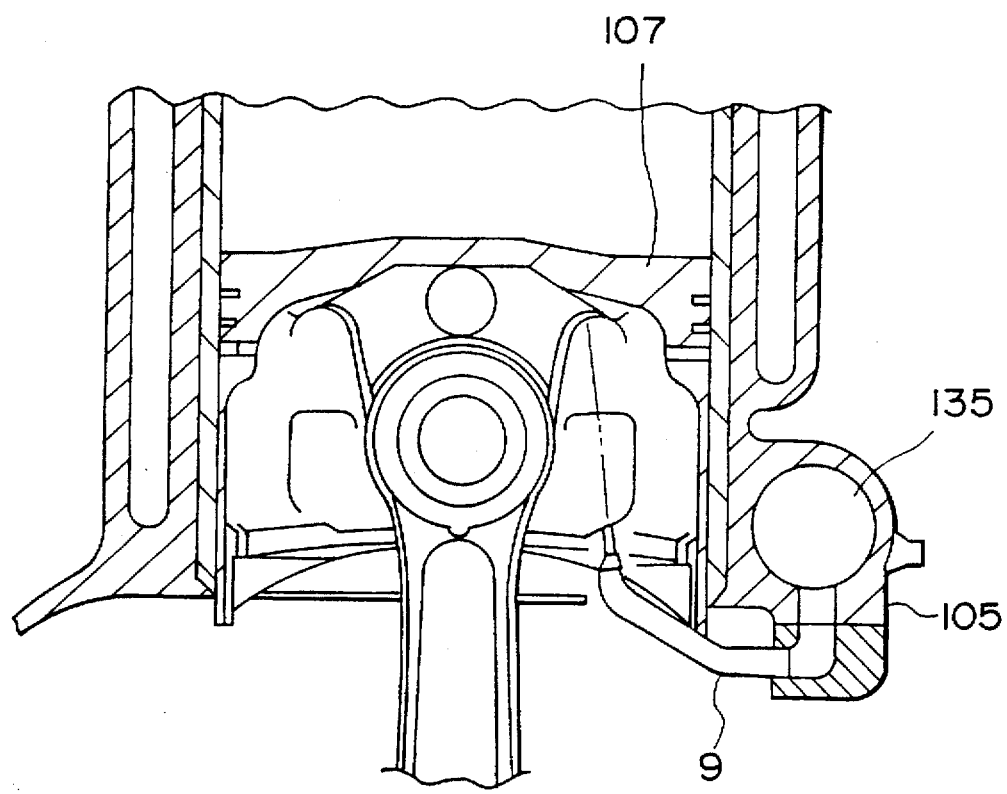
FIG. 22 is a sectional view of essential parts of an engine, according to the third embodiment of this invention.
Figure 23:
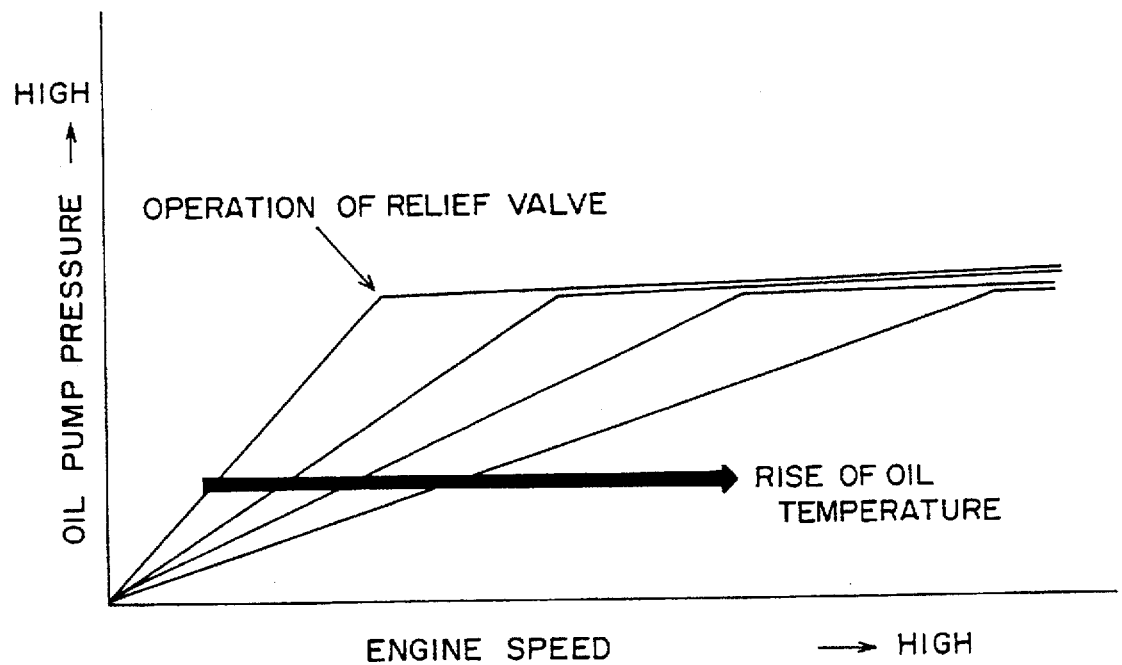
FIG. 23 is a graph showing a relation between the engine speed and an oil pump discharge pressure according to the third embodiment of this invention.

The oil jet nozzle 9 is connected to the second oil supply passage 135 which is formed in the cylinder block 105 as shown in FIG. 22. The oil jet nozzle 9 ejects lubricating oil guided via the second oil supply passage 135 towards the rear of a piston 107, and the heat of the piston 107 and cylinder walls is absorbed by this oil. Ejection of lubricating oil from the oil jet nozzle 9 is controlled only by the oil pressure supply control valve 136, and there is consequently no need to provide a valve or other device in every cylinder to control oil ejection.

In the low engine speed region when the discharge pressure P of the oil pump 91 led from the oil pressure chamber 137 does not exceed a predetermined value $P_1$, the oil pressure supply control valve 136 closes the second oil supply passage 135, and ejection of lubricating oil from the oil jet nozzle 9 is stopped.

In the medium and high engine speed regions when the pressure P exceeds the predetermined value $P_1$, the oil pressure supply control valve 136 moves the valve body 102 to the right against the force of the return spring 101 so as to open the second oil supply passage 135. Lubricating oil is therefore ejected from the oil jet nozzle 9 towards the rear of the piston 107, and the heat of the piston 107 and cylinder walls is absorbed.

As the temperature of the lubricating oil rises, its viscosity falls, and pressure losses in the oil supply passages 134, 135 become smaller. The discharge pressure of the oil pump therefore falls with increasing lubricating oil temperature. The result is that when lubricating oil temperature rises, the engine speed at which the relief valve 106 opens shifts to high speed, and the engine speed at which the oil pressure supply control valve 136 opens the second oil supply passage 135 also shifts to high speed.

In a conventional device wherein the connecting rod bearing is provided with a lead alloy overlay having a lower thermal conductivity than the throw, the heat absorption/discharge cycle due to the overlay does not function effectively, so lubricating oil temperature tends to rise due to increased frictional resistance between the bearing and the throw. This easily leads to a vicious cycle wherein frictional losses in the bearing increase due to rise of lubricating oil temperature, and oil temperature increases further due to the increased frictional losses.

When lubricating oil is ejected from the oil jet nozzle 9, the temperature of this oil rises due to the heat of the piston, etc., so that the vicious cycle is more likely to occur. As a result, the valve opening timing of the oil pressure supply control valve 136 that controls ejection of lubricating oil from the oil jet nozzle 9, shifts to high engine speed, the lubricating oil amount flowing out of the clearances between the bearing metals increases markedly, and there is even a possibility that the suitable amount of lubricating oil for the engine speed may not be ejected from the oil jet nozzle.

According to this invention, the overlay 2 of the upper and lower bearing metals 22, 21 are formed of a material having a higher thermal conductivity than that of the throw 35. Hence, even if the lubricating oil ejected from the oil jet nozzle 9 absorbs the heat of the piston 107 so that its temperature rises, an effective heat absorption/discharge cycle is established between the lubricating oil and overlay 2. This prevents sharp increase of frictional losses in the minimum thickness oil film 4, and avoids sudden increases of lubricating oil temperature.

The valve opening timing of the oil pressure supply control valve 136 does not shift to high engine speed, and the amount of lubricating oil flowing out of the clearances in the sliding parts to which this oil is supplied does not increase. The amount of lubricating oil ejected from the oil jet nozzle 9 can therefore be maintained at a suitable level depending on the engine speed, and the piston 107 and cylinder walls can be properly cooled.

The embodiments of this invention in which an exclusive property or privilege is claimed are defined as follows:

1. A lubricating structure for a connecting rod and crankshaft applied to a reciprocating engine comprising:
   a throw formed in said crankshaft,
   a bearing provided in said connecting rod, said bearing supporting said throw such that said throw is free to rotate while a position at which a minimum thickness oil film formed between said throw and said bearing moves over entire circumference of said bearing as said crankshaft rotates, and
   an oil passage formed in said crankshaft for supplying lubricating oil between said throw and said bearing, said bearing having a laminated structure comprising an overlay in contact with said throw, a metal layer disposed under said overlay and a back metal disposed under said metal layer, wherein the thermal conductivity of said overlay is higher than that of said throw such that a heat generated in said minimum thickness oil film is absorbed by said overlay and then discharged to lubricating oil between said throw and said bearing at a position distant from said minimum thickness oil film as said crankshaft rotates.

2. A lubricating structure as defined in claim 1, wherein said throw has a microfinishing treatment.

3. A lubricating structure as defined in claim 1, wherein the hardness of said overlay is lower than said metal layer.

4. A lubricating structure as defined in claim 1, wherein the hardness of said metal layer is lower than that of said back metal.

5. A lubricating structure as defined in claim 1, wherein said overlay comprises an alloy of aluminum and tin.

6. A lubricating structure as defined in claim 1, wherein said metal layer comprises an alloy of copper and lead.

7. A lubricating structure as defined in claim 1, further comprising means for increasing a supply amount of said lubricating oil according to an increase in speed of said engine.

8. A lubricating structure as defined in claim 1, further comprising an oil pump driven by said engine for discharging said lubricating oil, an oil jet nozzle for ejecting said lubricating oil towards an engine piston, and means for stopping the ejection of said oil jet nozzle when a discharge pressure of said oil pump does not reach a predetermined value.

9. A lubricating structure for a connecting rod and crankshaft applied to a reciprocating engine comprising:
a throw formed in said crankshaft,
a bearing provided in said connecting rod, said bearing supported said throw such that said throw is free to rotate,
an oil passage formed in said crankshaft for supplying lubricating oil between said throw and said bearing, said bearing having a laminated structure comprising an overlay in contact with said throw, a metal layer disposed under said overlay and a back metal disposed under said metal layer, wherein the thermal conductivity of said overlay is higher than that of said throw,
an oil pump is driven by said engine for discharging said lubricating oil,
an oil jet nozzle for ejecting said lubricating oil towards an engine piston, and
means for stopping the ejection of said oil jet nozzle when a discharge pressure of said pump does not reach a predetermined value.

10. A lubricating structure as defined in claim 9, wherein said throw has a microfinishing treatment.

11. A lubricating structure for a connecting rod and crankshaft applied to a reciprocating engine comprising:
a throw formed in said crankshaft;
a bearing provided in the connecting rod, said bearing operatively connecting the connecting rod and said throw, said bearing having a laminated structure comprising:
an overlay in contact with said throw;
a metal layer disposed under said overlay, and
a back metal disposed under said metal layer, wherein the thermal conductivity of said overlay is higher than that of said throw;
an oil passage formed in said crankshaft for supplying lubricating oil, supplied under pressure from an oil pump, between said throw and said bearing; and
valve means for selectively changing the proportion of the output of the pump which is delivered to said oil passage when the discharge amount of the pump is below a predetermined value.

12. A lubricating structure for a connecting rod and crankshaft applied to a reciprocating engine comprising:
a throw formed in said crankshaft;
a bearing provided in said connecting rod for operatively connecting said connecting rod and said throw, said bearing having a laminated structure comprising:
i) an overlay in operative contact with said throw, said overlay having a first predetermined thermal conductivity;
ii) a first metal layer disposed in contact with said overlay, said first metal layer having a second predetermined thermal conductivity lower than the first predetermined thermal conductivity; and
iii) a second metal layer disposed between said first metal layer, said second metal layer and a back metal, said second metal layer having a third predetermined thermal conductivity which is greater than said second predetermined thermal conductivity; and
means for supplying oil under pressure to said bearing.

13. A lubricating structure as defined in claim 12, wherein said oil supplying means includes:
a pump; and
a valve for controlling a proportion of pump output which is supplied to said bearing, said valve being operative to remain closed and to change the proportion of the pump output which is directed to said bearing until a predetermined operational parameter is detected.

14. A lubricating structure as defined in claim 13, wherein the predetermined operational parameter is the pressure of the oil discharged by the pump exceeding a predetermined limit.

15. A lubricating structure as defined in claim 13, wherein the predetermined operational parameter is at least one of engine coolant temperature, engine speed, and engine load.

* * * * *